United States Patent
Zhang et al.

(10) Patent No.: US 9,817,745 B2
(45) Date of Patent: Nov. 14, 2017

(54) BINARY PROGRAM INSTRUMENTATION AND DEBUGGING

(71) Applicant: Purdue Research Foundation, West Lafayette, IN (US)

(72) Inventors: Xiangyu Zhang, West Lafayette, IN (US); Zhui Deng, West Lafayette, IN (US); Dongyan Xu, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 196 days.

(21) Appl. No.: 14/595,901

(22) Filed: Jan. 13, 2015

(65) Prior Publication Data

US 2016/0321156 A1 Nov. 3, 2016

Related U.S. Application Data

(60) Provisional application No. 61/926,485, filed on Jan. 13, 2014.

(51) Int. Cl.
*G06F 9/44* (2006.01)
*G06F 11/36* (2006.01)
*G06F 21/56* (2013.01)

(52) U.S. Cl.
CPC ........ *G06F 11/362* (2013.01); *G06F 11/3636* (2013.01); *G06F 21/566* (2013.01); *G06F 2221/033* (2013.01)

(58) Field of Classification Search
None
See application file for complete search history.

(56) References Cited

U.S. PATENT DOCUMENTS

2008/0127114 A1* 5/2008 Vasudevan ............ G06F 21/566 717/129
2015/0121135 A1* 4/2015 Pape .................. G06F 11/1484 714/15

OTHER PUBLICATIONS

O. Agesen, et al., Software techniques for avoiding hardware virtualization exits. In USENIX ATC'12 (Aug. 2011).
P. Barham, et al., Xen and the Art of Virtualization. SOSP'03, Oct. 19-22, 2003, Bolton Landing, New York, USA.
U. Bayer, et al, TTAnalyze: A Tool for Analyzing Malware. In EICAR '06 (2006).
F. Bellard. QEMU, a Fast and Portable Dynamic Translator. In USENIX ATC'05 (2005), pp. 41-46.
S. Bhansali, et al. Framework for instruction-level tracing and analysis of program executions. VEE'06 Jun. 14-16, 2006, Ottawa, Ontario, Canada. 2006, pp. 154-163.

(Continued)

*Primary Examiner* — Evral E Bodden
(74) *Attorney, Agent, or Firm* — Purdue Research Foundation

(57) ABSTRACT

Disclosed is a system and method for setting breakpoints (BPs) that cannot be detected by code being debugged, e.g., to trap transparently at any instruction. The disclosed system and method permits execution tracing and instrumentation of binaries, including malware. The system and method can be used to analyze benign software also, e.g., software obfuscated for anti-reverse-engineering. An invisible breakpoint (IBP) is not detectable by the "guest," the program being debugged. Hardware virtualization is used to split the code and data views of the program's text segment(s).

12 Claims, 2 Drawing Sheets

(56) References Cited

OTHER PUBLICATIONS

R. R. Branco, et al. Scientific but Not Academical Overview of Malware Anti-Debugging, Anti-Disassembly and Anti-VM Technologies. Blackhat USA 2012.
S. Vogl, et al. Using Hardware Performance Events for Instruction-Level Monitoring on the x86 Architecture. Proceedings of the 2012 European Workshop on System Security (EuroSec'12).
D. Bruening. et al. Transparent Dynamic Instrumentation. VEE'12, Mar. 3-4, 2012, London, England, UK.
P. P. Bungale, et al. PinOs: A Programmable Framework for Whole-System Dynamic Instrumentation. VEE'07, Jun. 13-15, 2007, San Diego, California, USA.
A. Dinaburg, et al. Ether: Malware Analysis via Hardware Virtualization Extensions. CCS'08, Oct. 27-31, 2008, Alexandria, Virginia, USA.
P. Feiner, et al. Comprehensive Kernel Instrumentation via Dynamic Binary Translation. In ASPLOS'12, Mar. 3-7, 2012, London, England, UK.
P. Feiner, et al. Attacks on Virtual Machine Emulators. Symantec Advanced Threat Research, 2006.
P. Feiner, et al. Attacks on more virtual machine emulators. Symantec Advanced Threat Research, 2007.
T. Garfinkel, et al. A Virtual Machine Introspection Based Architecture for Intrusion Detection. In NDSS'03 (2003).
M. Grace, et al. Transparent Protection of Commodity OS Kernels Using Hardware Virtualization. Proceedings 6th Iternational ICST Conference, SecureComm 2010, Singapore, Sep. 7-9, 2010.
F. Guo, et al. A Study of the Packer Problem and Its Solutions. In RAID'08 (2008).
L.-K. Yan, et al.Combining Hardware Virtualization and Software Emulation for Transparent and Extensible Malware Analysis. VEE, 12, Mar. 3-4, 2012, London, England, UK.
M. G. Kang, et al. Emulating Emulation-Resistant Malware. VMSec'09, Nov. 9, 2009, Chicago, Illinois, USA.
M. A. Laurenzano, et al. PEBIL: Efficient Static Binary Instrumentation for Linux. International Symposium on Performance Analysis of Systems & Software (ISPASS), 2010 IEEE.
C. Willems, R. Hund, A. Fobian, D. Felsch, T. Holz, and A. Vasudevan. Down to the bare metal: Using processor features for binary analysis. ACSAC '12 Dec. 3-7, 2012, Orlando, Florida USA.
K. H. Lee, et al. High Accuracy Attack Provenance via Binary-based Execution Partition. In NDSS'13 (2013).
C. Luk, et al., Pin: Building Customized Program Analysis Tools with Dynamic Instrumentation. PLDI'05, Jun. 12-15, 2005, Chicago, Illinois, USA.
N. Nethercote, et al. Valgrind: A Framework for Heavyweight Dynamic Binary Instrumentation. PLDI'07 Jun. 11-13, 2007, San Diego, California, USA.
A. Nguyen, et al. MAVMM: Lightweight and Purpose Built VMM for Malware Analysis. In ACSAC'09 (2009).
T. Raffetseder, et al. Detecting System Emulators. Proceeding ISC'07 Proceedings of the 10th international conference on Information Security (2007).
A. Vasudevan. Re-inforced Stealth Breakpoints. In Crisis'09 (2009).
A. Vasudevan, et al. Cobra: Fine-grained malware analysis using stealth localized-executions. Proceedings of the 2006 IEEE Symposium on Security and Privacy (S&P'06).
K. Scott, et al. Retargetable and Reconfigurable Software Dynamic Translation. In CGO'03 (2003).
D. Song, et al., BitBlaze: A new approach to computer security via binary analysis. In ICISS'08 (2008).

* cited by examiner

BINARY PROGRAM INSTRUMENTATION AND DEBUGGING

RELATED APPLICATIONS

The present application claims the benefit of U.S. provisional application Ser. No. 61/926,485, filed Jan. 13, 2014, the contents of which are hereby incorporated by reference in its entirety.

STATEMENT OF FEDERALLY SPONSORED RESEARCH OR DEVELOPMENT

This invention was made with Government support under Contract No. HR0011-12-2-0006 awarded by the Defense Advanced Research Projects Agency (DARPA). The government has certain rights in the invention.

TECHNICAL FIELD

The present application relates to debugging of software, and particularly to setting breakpoints.

BACKGROUND

Malware, viruses, and other undesired or ill-behaved software programs sometimes read their own program code in memory to determine whether they are running under a debugger. If so, they do not perform their designed actions (e.g., communicating with control servers). This prevents those actions from being traced and blocked. There is, therefore, a need of setting breakpoints in a way that is invisible to the guest software being debugged.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
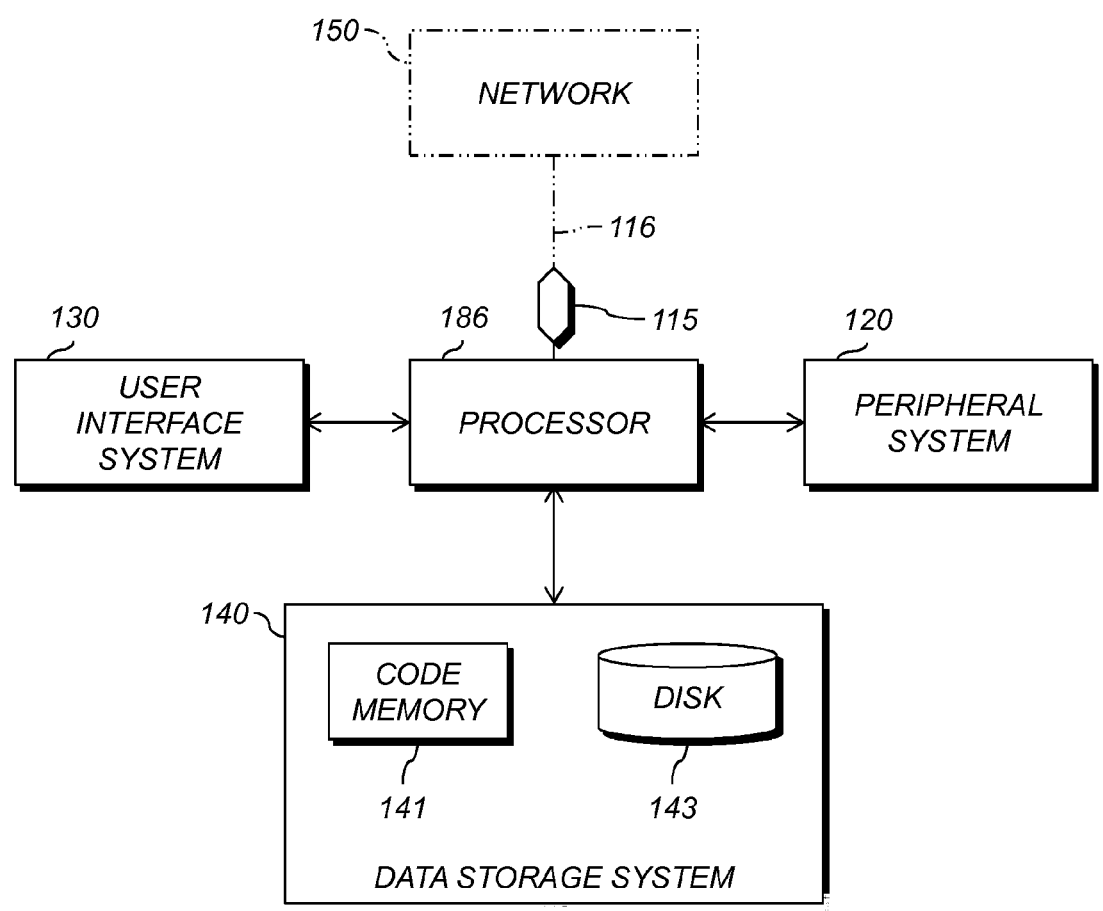
FIG. 1 is a high-level diagram showing the components of a data-processing system.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Disclosed is a system and method for setting breakpoints (BPs) that cannot be detected by code being debugged, e.g., to trap transparently at any instruction. Exemplary users include malware-defense investigators; antivirus software companies; and anyone analyzing malware, spyware, adware, viruses, or other potentially-disruptive code or code of unknown provenance. The disclosed system and method permits execution tracing and instrumentation of binaries, including malware. The system and method can be used to analyze benign software also, e.g., software obfuscated for anti-reverse-engineering. An invisible breakpoint (IBP) is not detectable by the "guest," the program being debugged. Hardware virtualization is used to split the code and data views of the program's text segment(s).

Various aspects permit setting breakpoints, those breakpoints being undetectable to the guest software. An important and unique property of disclosed system and method is that it permits detecting the presence of a third party, including a malware program, spyware program, computer virus, or other potentially-disruptive code, trying to gain knowledge of a cryptographic key or other secret information. A third party trying to eavesdrop on a key must in some way measure it using processor instructions. By using the disclosed system and method, breakpoints can be set on potentially-disruptive instructions so that the behavior of the guest can be monitored. For example, before the guest program is executed, a breakpoint can be set on each "rep movsb" instruction, and the breakpoint handler can check that the instruction is not attempting to trash the stack or read a sensitive memory location before permitting the instruction to proceed. Similarly, breakpoints can be set on calls or traps to kernel routines that transmit and receive data across a network. In this way, a communication system can be implemented which detects eavesdropping or other potentially malicious behavior. In case of such behavior, the guest program can be aborted, its communications blocked, or other cybersecurity actions taken.

Throughout this disclosure, examples are given of INTEL x86 assembly and processor architecture. The techniques described herein can be used on any processor that permits discriminating between read-only and execute-only pages of memory under software control. Herein, the abbreviation "BP" refers to breakpoints. If the base-pointer register of the x86 is referred to, the abbreviation "ebp" or the term "register bp" are used. On the x86, a breakpoint is a one-byte interrupt 3 instruction, "int 3" or hex value 0xCC. To set a breakpoint on an instruction, the debugger overwrites the first byte of the instruction with 0xCC. A trap then occurs when the processor executes the 0xCC, and the debugger executes while the program is suspended.

As part of the disclosed system and method, an extended page table maps guest to host physical pages, not virtual page to physical page. Only one EPT entry exists for each guest page, but two physical pages can be allocated. The breakpoint (e.g., an int 3 instruction, 0xCC, on an x86) is written into the executable but not readable physical page (X&~R). The X&R configuration is available on various processors, e.g., the Intel Core i7™. The readable but not executable physical page remains unchanged. When the EPT refers to the executable page, the breakpoint is hit. When switching from execute to read view (e.g., when the guest tries to read its own code to see if it is running in a debugger), an EPT violation occurs. The EPT entry is then switched to the readable, not executable view (~X&R), and execution of the guest out of another page can proceed. When the guest tries to execute code in a page currently readable, an EPT violation occurs and the EPT is changed to point to the X&~R page. Some processors with separate instruction and data paths (e.g., TLBs, translation lookaside buffers) can access the two physical pages separately, without requiring changing the EPT on each EPT violation. As long as both the read and the execute pages are in the respective TLBs (i.e., have not been evicted), no EPT violation will occur except the first one, which loads the pages. The processor fetches from the appropriate TLB.

Thus the guest executes straight-line as long as it is just executing. An on-demand switch to the data view is performed when the guest tries to read its text segment. Mapping back to code view is performed when switching back to instruction fetch.

Breakpoints can trap instructions before or after they are executed. A BP handler can execute before or after the guest executes the restored instruction.

To execute handlers after the guest instruction is executed, when a breakpoint is hit, the instruction is restored in the code view. The single-step flag (Monitor Trap Flag, MTF, on an x86) is turned on. MTF is transparent, unlike regular EFLAGS.TF (which can be accessed with pushf/pop eax). The guest executes the restored instruction, then the hypervisor restores the 0xCC. Note that an interrupt can happen as soon as guest resumes. Then the guest resumes back to the interrupt handler. The BP handler in this situation should not be called until after the guest instruction has executed, as desired, so a retry can be performed.

The guest can be a virtual machine (VM) running an operating system (OS) or can be another program. This permits monitoring malware even if the malware attains the highest privilege level (Ring 0 on an x86).

All discussion herein relating to pages also applies to segments or other ways of dividing memory, provided that whatever way memory is divided permits setting the memory division containing the breakpoint to either X&~R or ~X&R, and changing the setting dynamically as the guest executes. In an example, the text segment of the guest (the segment identified by the selector in the CS register) is changed between X&~R or ~X&R to provide invisible breakpoints.

In some processor architectures, memory addresses instead of or in addition to the breakpoint address may be modified when setting a breakpoint. Nothing herein limits the breakpoint to being a single-byte modification at the breakpoint address. The term "address" can refer to physical or virtual addresses unless otherwise specified. Instead of creating separate code and data views, the page fault handler(s) can add or remove the breakpoint at runtime to provide for execution of the breakpoint but reading of the original instructions.

Figure 2:
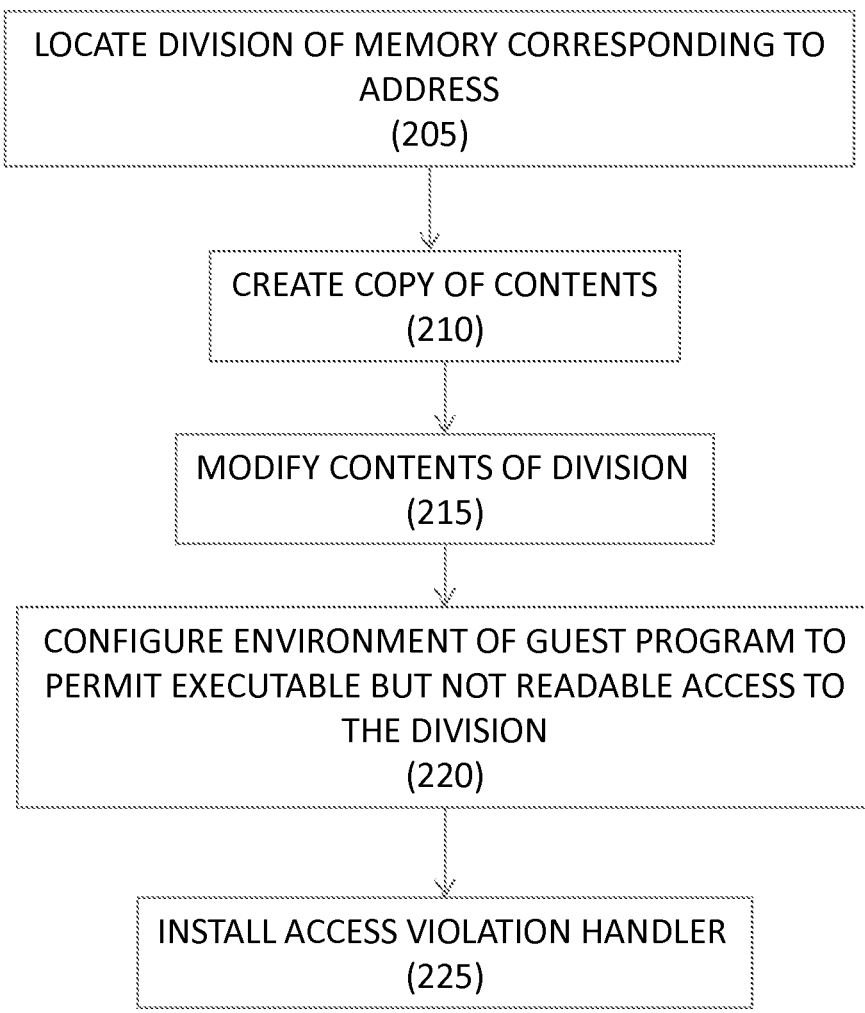
FIG. 2 is a flowchart showing steps of a method for setting breakpoints according to one embodiment.

FIG. 2 illustrates an exemplary method of setting a breakpoint on a guest software program in a memory of a data-processing system which includes automatically performing the following steps using a processor:

receiving an indication of an address for the breakpoint;

locating a division of memory (e.g., a page or segment) corresponding to the address (i.e., which division has to be modified to set the breakpoint) (stage 205);

creating a copy of at least part of the contents of the division (or of the whole division) (stage 210);

modifying the contents of the division to set a breakpoint at the address (e.g., insert 0xCC) (more than one division can be copied and modified if necessary to set the breakpoint)(stage 215);

configuring an environment (e.g., page tables, EPT) of the guest software program to permit executable but not readable access (X&~R) to the division(stage 220); and installing a page fault handler (stage 225) so that:

when the guest software program attempts to read at least some of the contents of the executable-but-not-readable division, the processor will provide a data view using the copy (the data view can be a straight copy of the original division before the breakpoint was added, or can be a re-creating of the original made, e.g., by undoing the breakpoint) and configure the environment (page table) to permit readable but not executable (~X&R) access to the data view in place of the division (e.g., switch the page table entry to the unmodified host page and set ~X&R, or modify the page and change the permission bits); and when the guest software program attempts to execute at least some of the contents of the readable-but-not-executable division (~X&R), the processor will configure the environment to permit executable but not readable access (X&~R) to the division having the modified contents (e.g., switch back to the X&~R page and set X&~R, or modify the page and change the permission bits).

In various aspects, these operations are performed by the hypervisor and hence invisible to the guest program or system. The guest system sees the original division but actually executes the modified division. In various aspects, the method further includes providing a breakpoint handler configured to provide a visual indication on a display screen (e.g., a debugger prompt or register dump) when execution of the guest reaches the breakpoint in the modified division.

In flowcharts herein, the steps can be performed in any order except when otherwise specified, or when data from an earlier step is used in a later step. References to specific components in explanations of flowcharts are exemplary and not limiting.

In view of the foregoing, various aspects provide invisible breakpoints. A technical effect is to provide a visual indication of the breakpoint on a display screen, e.g., by invoking a debugger such as gdb when the breakpoint is hit so that gdb displays trace information and permits interactive debugging and inspection of the guest program.

FIG. 1 is a high-level diagram showing the components of an exemplary data-processing system for analyzing data and performing other analyses described herein, and related components. The system includes a processor 186, a peripheral system 120, a user interface system 130, and a data storage system 140. The peripheral system 120, the user interface system 130 and the data storage system 140 are communicatively connected to the processor 186. Processor 186 can be communicatively connected to network 150 (shown in phantom), e.g., the Internet or an X.15 network, as discussed below. Any data-processing device described herein can include one or more of systems 186, 120, 130, 140, and can each connect to one or more network(s) 150. Processor 186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 186 can implement processes of various aspects described herein. Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 120, user interface system 130, and data storage system 140 are shown separately from the data processing system 186 but can be stored completely or partially within the data processing system 186.

The peripheral system 120 can include one or more devices configured to provide digital content records to the processor 186. For example, the peripheral system 120 can include digital still cameras, digital video cameras, cellular phones, or other data processors. The processor 186, upon receipt of digital content records from a device in the peripheral system 120, can store such digital content records in the data storage system 140.

The user interface system 130 can include a mouse, a keyboard, another computer (connected, e.g., via a network or a null-modem cable), or any device or combination of devices from which data is input to the processor 186. The user interface system 130 also can include a display device, a processor-accessible memory, or any device or combination of devices to which data is output by the processor 186. The user interface system 130 and the data storage system 140 can share a processor-accessible memory.

In various aspects, processor 186 includes or is connected to communication interface 115 that is coupled via network link 116 (shown in phantom) to network 150. For example, communication interface 115 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 115 sends and receives electrical, electromagnetic or optical signals that carry digital or analog data streams representing various types of information across network link 116 to network 150. Network link 116 can be connected to network 150 via a switch, gateway, hub, router, or other networking device.

Processor 186 can send messages and receive data, including program code, through network 150, network link 116 and communication interface 115. For example, a server can store requested code for an application program (e.g., a JAVA applet) on a tangible non-volatile computer-readable storage medium to which it is connected. The server can retrieve the code from the medium and transmit it through network 150 to communication interface 115. The received code can be executed by processor 186 as it is received, or stored in data storage system 140 for later execution.

Data storage system 140 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 120), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 140 can be a tangible non-transitory computer-readable storage medium, i.e., a non-transitory device or article of manufacture that participates in storing instructions that can be provided to processor 186 for execution.

In an example, data storage system 140 includes code memory 141, e.g., a RAM, and disk 143, e.g., a tangible computer-readable rotational storage device such as a hard drive. Computer program instructions are read into code memory 141 from disk 143. Processor 186 then executes one or more sequences of the computer program instructions loaded into code memory 141, as a result performing process steps described herein. In this way, processor 186 carries out a computer implemented process. For example, steps of methods described herein, blocks of the flowchart illustrations or block diagrams herein, and combinations of those, can be implemented by computer program instructions. Code memory 141 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 186 (and possibly also other processors), to cause functions, acts, or operational steps of various aspects herein to be performed by the processor 186 (or other processor). Computer program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer. The breakpoint handler can communicate with a remote debugger, e.g., via a serial link or network connection.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method of setting a breakpoint at an address in a guest software program in a memory of a virtualized data-processing system, the method comprising automatically performing the following steps using a processor:
   a) locating a division of memory corresponding to the address;
   b) creating a copy of at least part of the contents of the division;
   c) modifying the contents of an instruction set of the division to set a breakpoint at the address;
   d) configuring an environment of the guest software program to permit executable but not readable access to the division; and
   e) installing an access violation handler so that:
      i) when the guest software program attempts to read at least some of the contents of the modified division, the processor will provide a data view using the copy of the division and configure the environment to permit readable but not executable access to the data view in place of the division; and
      ii) when the guest software program attempts to execute at least some of the contents of the division, the processor will configure the environment to provide a code view using the division having the modified contents which grants executable but not readable access.

2. The method according to claim 1, wherein the permission settings of the division is not visible to the guest software program.

3. The method according to claim 2, wherein a permission setting feature of the processor running the software is used to configure the permissions settings.

4. The method according to claim 1, further comprising:
   a) using the processor, intercepting at least one breakpoint event, said interception is invisible to the guest software program.

5. The method of claim 4, further comprising:
   a) using the processor, executing at least one breakpoint handler in the host, said executing invisible to the guest software program.

6. The method of claim 1, wherein the guest software program is a malware program.

7. A system, comprising:
   a) a computer processor;
   b) a memory storage device coupled to the processor and comprising computer readable instructions for executing a method of setting a breakpoint at an address in a guest software program in the memory, the method comprising:
      i) locating a division of memory corresponding to the address;
      ii) creating a copy of at least part of the contents of the division;
      iii) modifying the contents of an instruction set of the division to set a breakpoint at the address;
      iv) configuring an environment of the guest software program to permit executable but not readable access to the division; and
      v) installing an access violation handler so that:
         A) when the guest software program attempts to read at least some of the contents of the modified division, the processor will provide a data view using the copy of the division and configure the environment to permit readable but not executable access to the data view in place of the division; and
         B) when the guest software program attempts to execute at least some of the contents of the division, the processor will configure the environment to provide a code view using the division having the modified contents which grants executable but not readable access.

8. The system of claim 7, wherein the permission settings of the division is not visible to the guest software program.

9. The system of claim 8, wherein a permission setting feature of the processor running the software is used to configure the permissions settings.

10. The system of claim 7, the method further comprising:
    a) using the processor, intercepting at least one breakpoint event, said interception is invisible to the guest software program.

11. The system of claim 10, the method further comprising:
    a) using the processor, executing at least one breakpoint handler in the host, said executing invisible to the guest software program.

12. The system of claim 7, wherein the guest software program is a malware program.

* * * * *